US010288350B1

(12) United States Patent
Wu

(10) Patent No.: US 10,288,350 B1
(45) Date of Patent: May 14, 2019

(54) PROCESS FOR SEPARATING SOLVENT FROM SPENT OIL SAND SOLIDS USING SUPERHEATED STEAM

(71) Applicant: SYNCRUDE CANADA LTD. in trust for the owners of the Syncrude Project as such owners exist now and in the future, Fort McMurray (CA)

(72) Inventor: Xin Alex Wu, Edmonton (CA)

(73) Assignee: SYNCRUDE CANADA LTD., Fort McMurray (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 16/002,873

(22) Filed: Jun. 7, 2018

(51) Int. Cl.

| | |
|---|---|
| ***B01D 11/02*** | (2006.01) |
| ***F26B 25/00*** | (2006.01) |
| ***F26B 17/10*** | (2006.01) |
| ***C10G 53/02*** | (2006.01) |

(52) U.S. Cl.
CPC ............ *F26B 25/006* (2013.01); *C10G 53/02* (2013.01); *F26B 17/107* (2013.01); *C10G 2300/44* (2013.01)

(58) Field of Classification Search
CPC . C10G 1/04; C10G 1/00; C10G 1/045; C10G 2300/44; C10G 1/006; C10G 1/042; C10G 29/16; C10G 35/095; B01D 11/028; B01D 11/0242; B01D 2011/002; B01D 11/0257
See application file for complete search history.

(56) References Cited

U.S. PATENT DOCUMENTS

| | | | |
|---|---|---|---|
| 3,475,318 | A | 10/1969 | Gable et al. |
| 4,139,450 | A | 2/1979 | Hanson et al. |
| 4,189,376 | A | 1/1980 | Mitchell |

(Continued)

FOREIGN PATENT DOCUMENTS

| | | |
|---|---|---|
| CA | 2012563 | 9/1991 |
| CA | 2715301 | 3/2011 |

(Continued)

OTHER PUBLICATIONS

Kudra, T., et al. Superheated Steam Drying. Advanced Drying Technologies, 2nd Edition. 2009. Chapter 7. CRC Press. pp. 89-118.

(Continued)

*Primary Examiner* — Sharon Pregler
(74) *Attorney, Agent, or Firm* — Bennett Jones LLP

(57) ABSTRACT

A process for separating solvent from spent oil sand solids involves drying the solids using superheated steam, and thereby producing a vapor comprising the vaporized solvent and vaporized water. The vapor is conveyed through a hot side of a first heat exchanger to produce a cooled stream comprising condensed solvent and condensed water, while a water stream is conveyed under vacuum through a cold side of the first heat exchanger to produce steam. A vacuum blower that applies the vacuum may also compress the steam to adiabatically heat the steam, before the steam is further heated by a steam superheater. The condensed water is separated from the cooled stream, and used in producing the water stream that is conveyed through the cold side of the heat exchanger, as the process continues. The steam is used in producing the superheated steam for drying the solids, as the process continues.

21 Claims, 4 Drawing Sheets

(56) References Cited

U.S. PATENT DOCUMENTS

| | | | |
|---|---|---|---|
| 4,311,561 | A | 1/1982 | Hastings |
| 4,347,118 | A | 8/1982 | Funk et al. |
| 4,422,901 | A | 12/1983 | Karnofsky |
| 4,448,667 | A | 5/1984 | Karnofsky |
| 4,460,452 | A | 7/1984 | Johnson et al. |
| 4,539,093 | A | 9/1985 | Friedman et al. |
| 4,571,294 | A | 2/1986 | Friedman et al. |
| 4,719,008 | A | 1/1988 | Sparks et al. |
| 4,722,782 | A | 2/1988 | Graham et al. |
| 4,968,412 | A | 11/1990 | Guymon |
| 5,534,136 | A | 7/1996 | Rosenbloom |
| 2009/0294332 | A1 | 12/2009 | Ryu |
| 2012/0048782 | A1 | 3/2012 | Wu et al. |

FOREIGN PATENT DOCUMENTS

| | | | |
|---|---|---|---|
| CA | 2724806 | | 6/2011 |
| CA | 2734067 | | 9/2011 |
| CA | 2794373 | A1 | 5/2014 |
| CA | 2895118 | A1 | 12/2016 |

OTHER PUBLICATIONS

Monceaux, D.A., et al. Dryhouse Technologies and DDGS Production. The Alcohol Textbook, 5th Edition. 2009. Chapter 21. Nottingham University Press. pp. 303-322.

Williams, M.A., et al. Recovery of Oils and Fats From Oilseeds and Fatty Materials. Baileys Industrial Oil and Fat Products, 6th Edition. vol. 5 Edible Oil and Fat Products: Processing Technologies. 2005. Chapter 3. Wiley-Interscience. pp. 171-189.

| Stream No. | Description | $H_2O$ rate (t/h) | | $C_6 - C_9$ Rate (t/h) | | T (°C) | | P (kPa abs.) | |
|---|---|---|---|---|---|---|---|---|---|
| | | Fig. 1 | Fig. 2 | Fig. 1 | Fig. 2 | Fig. 1 | Fig. 2 | Fig. 1 | Fig. 2 |
| 10 | Wet solids feed | 31.5 | 31.5 | 58.8 | 58.8 | 45 | 45 | 95 | 95 |
| 16 | Dry solids product | 2.8 | 2.8 | 0.2 | 0.2 | 100 | 100 | 95 | 95 |
| 24 | Vapor from dryer | 123.7 | 123.7 | 58.6 | 58.6 | 127 | 127 | 95 | 95 |
| 28 | Compressed Vapor | 123.7 | 123.7 | 58.6 | 58.6 | 183 | 150 | 171 | 122 |
| 32 | 1st-stage condensed mixture | 123.7 | 123.7 | 58.6 | 58.6 | 105 | 95 | 161 | 112 |
| 36 | 1st-stage condensed water | 93.9 | 92.8 | 0 | 0 | 104 | 94 | 156 | 107 |
| 106 | 2nd-stage condensed water | N/A | 15.3 | N/A | 0 | N/A | 91 | N/A | 110 |
| 108 | Recycled steam water | 33.3 | 38.0 | 0 | 0 | 98 | 88 | 105 | 84 |
| 38 | Combined hot water | 140 | 140 | 0 | 0 | 101 | 92 | 110 | 80 |
| 40 | Saturated steam | 106.7 | 102 | 0 | 0 | 98 | 88 | 90 | 60 |
| 74 | Steam at blower exhaust | 106.7 | 102 | 0 | 0 | 123 | 164 | 110 | 110 |
| 14 | Superheated steam | 95 | 95 | 0 | 0 | 752 | 752 | 100 | 100 |

FIG. 3

| Process | Natural gas (kg/h) | Electricity (kW) | | | |
|---|---|---|---|---|---|
| | Furnace 46 | Blower 26 | Vacuum Blower 110 | Blowers 116/130 | Total |
| **Fig. 1** | 2900 | 5602 | 1381 | n/a | 6983 |
| **Fig. 2** | 2730 | 2286 | 4088 | 423 | 6797 |

PROCESS FOR SEPARATING SOLVENT FROM SPENT OIL SAND SOLIDS USING SUPERHEATED STEAM

FIELD OF THE INVENTION

The present invention relates to a process for separating hydrocarbon solvent from spent oil sand solids after oil sand bitumen has been extracted with the solvent. More particularly, the present invention relates to improvements to such a process that uses superheated steam to heat the solids, which improvements may increase the energy efficiency of the process, and the solvent recovery by the process.

BACKGROUND OF THE INVENTION

Solvent extraction processes that use hydrocarbon solvents to extract bitumen from mined oil sands require little or no water, generate no wet tailings, and can achieve higher bitumen recovery than the existing Clark hot water extraction process or its variants. However, they requires a process for effective separation of solvent from the spent oil sands solids. This separated solvent may be recycled for use in extracting bitumen as the solvent extraction process continues. The separated oil sands solids may be used to form trafficable solids. Typical spent oil sands solids are in solid lump form, and contain water in the amount of about 5 weight percent, and solvent in the amount of about 5 to 10 weight percent. The solvent trapped in the spent oil sands solids is difficult to remove and recover.

FIG. 1 shows a flow diagram of a process for recovering solvent from spent oil sands solids, as described in Canadian Patent No. 2,794,373 (Wu et al.). The process involves drying the solids using superheated steam to vaporize solvent and water. The vapor is compressed and condensed in the hot side of a first heat exchanger to produce condensates including condensed hot water, condensed solvent, and uncondensed vapor. The condensed hot water and condensed solvent are separated from the uncondensed vapor in a first separator. Hot water is flowed through the cold side of the first heat exchanger to produce near-saturated steam. The near saturated steam is superheated in a second heat exchanger to produce the superheated steam for drying the solids. Uncondensed vapor from the first separator can be further condensed in a third heat exchanger to produce warm water, recovered solvent, and uncondensed off gas. The uncondensed off gas can be separated in a second separator. Some of the warm water is combined with the hot water to produce the near-saturated steam for superheating. The off gas is oil scrubbed or combusted prior to release to the atmosphere.

The process described by Wu et al. can effectively recover solvents form spent oil sands solids. However, a substantial amount of energy is needed to produce the condensates by compressing the vapor by a compression ratio in the range of 1.3 to 2.5. Compression is needed to raise the dew point of the vapor above 100° C. so that there is a temperature difference between condensing vapor on the hot side and vaporizing water on the cold side. However, compression of the vapor substantially raises the temperature of the vapor due to the adiabatic effect. While some of the heat in the vapor is transferred to the steam which is used in drying the solids, excess steam production wastes energy. Furthermore, higher vapor temperature needs to be brought down to its dew point prior to condensation in the heat exchanger. While the heat transfer coefficient for vapor condensation is high, the heat transfer coefficient for gas/vapor cooling is quite low. This increases the heat exchanging area required of the first heat exchanger, and hence the capital cost of the heat exchanger.

Commercial application of the solvent recovery process described in Wu et al. would benefit from improvements, including improvements in energy efficiency. For large-scale oil sands operations involving throughput rates on the magnitude of 8000 tonnes per hour of mined oil sands, even incremental gains in energy efficiency can substantially impact absolute energy consumption and operating costs.

SUMMARY OF THE INVENTION

Improvements, as described below, are made to the process for recovering solvent from spent oil sands solids described in Canadian Patent No. 2,794,373 (Wu et al.). Each of the improvements may be implemented individually, or in combination with one or more of the other improvements.

First, when conveying vapor produced by drying the solids through the hot side of a first heat exchanger, a vacuum is applied to the cold side of the first heat exchanger through which a water stream is conveyed. Consequently, the water stream forms steam at a temperature that is lower than the temperature that would be required to form steam in the absence of the vacuum, which is around 100° C. Therefore, the dew point of the vapor flowing through the hot side of the first heat exchanger may not need to be as high as in the prior art method described in Wu et al. to achieve the same temperature difference between the condensing and the vaporizing sides of the exchanger. This means that the vapor does not to be compressed at all, or at least not as much as in the prior art method described in Wu et al., before the vapor is conveyed through the hot side of the first heat exchanger. Less compression reduces or minimizes the increase in vapor temperature by the adiabatic effect. This reduces or minimizes the generation of excess steam, and the heat exchanging area required of the first heat exchanger.

Second, the steam produced by conveying the water stream through the cold side of the first heat exchanger may be subsequently compressed to break the vacuum to reach near atmospheric pressure for its reuse in the dryer. This compression increases the temperature of the steam according to the adiabatic effect. The compression is desirable on this side of the process since it can be used to increase the temperature of the steam towards a superheated condition. Therefore, less energy may be required from a gas-fired furnace that may be used to further heat the steam towards the superheated condition. Surprisingly, the combined energy, likely electric energy, required to compress the vapor and compress the steam, may be less than the energy required to compress the vapor in the prior art method described in Wu et al.

Third, the solids may be dried under a vacuum (i.e., under pressure conditions that are less than atmospheric pressure). This decreases the solids temperature at which liquid solvent and water in the solids vaporizes to form the vapor that is flowed through the hot side of the first heat exchanger. Accordingly, the dried solids may be produced at a lower temperature than that produced in the prior art process described in Wu et al., which results in less heat energy being wasted in the dried solids.

Fourth, a portion of the steam produced by the first heat exchanger may be used to strip residual solvent from the dried solids. This makes use of excess steam that may be produced by the first heat exchanger.

Fifth, a portion of the superheated steam produced by a steam superheater may be used to heat the vapor in a cyclone/baghouse that is used to filter fine solids from the vapor. This may help maintain the vapor temperature in the cyclone/baghouse above its dew point, and thereby prevent formation of condensates in the cyclone/baghouse.

Sixth, a portion of the water stream that emerges from the cold side of the first heat exchanger may not be converted to steam, but may contain a substantial amount of heat. To reduce loss of heat from this portion of the water stream, it may be recycled to the water stream that flows through the cold side of the first heat exchanger.

Seventh, the uncondensed vapor that emerges from the first heat exchanger may have substantial heat energy. The uncondensed vapor is flowed through a second heat exchanger and a third heat exchanger to produce a second portion of condensed water, and a third portion of condensed water, where the second and third heat exchangers are arranged in series. The second and third portions of condensed water may be recycled to the water stream that flows through the cold side of the first heat exchanger to reduce loss of heat from the uncondensed vapor. Preferably, the temperature of the second portion of condensed water is higher than the temperature of the third portion of condensed water. Preferably, the amount of the second portion of condensed water that is recycled to water stream that flows through the cold side of the first heat exchanger is greater than the amount of the third portion of condensed water that is recycled to water stream that flows through the cold side of the first heat exchanger.

In one aspect, the present invention comprises a process for separating solvent from spent oil sand solids. The process includes the steps of:

(a) drying the solids using superheated steam, and thereby producing dried solids, and a vapor comprising the vaporized solvent and vaporized water;

(b) conveying the vapor through a hot side of a first heat exchanger, while conveying a water stream under vacuum through a cold side of the first heat exchanger, thereby heating the water stream to produce steam, and cooling the vapor to produce a first portion of uncondensed vapor, and a first cooled stream comprising a first portion of condensed solvent and a first portion of condensed water;

(c) separating the first portion of condensed water from the first cooled stream, and using at least part of the separated first portion of the condensed water in producing the water stream of step (b), as the process continues; and (d) using a first portion of the steam in producing the superheated steam of step (a), as the process continues.

In one embodiment of the process, the cold side of the first heat exchanger is at a pressure of less than about 70 kPa absolute.

In one embodiment of the process, producing the superheated steam comprises adiabatically compressing the first portion of the steam to heat the first portion of the steam. Adiabatically compressing the first portion of the steam may increase a pressure of the steam to less than about 110 kPa, absolute. Adiabatically compressing the first portion of the steam may superheat the steam.

In one embodiment of the process, the process may further comprise the step of, before conveying the vapor through the hot side of the first heat exchanger, adiabatically compressing the vapor to heat the vapor, wherein a temperature increase in the vapor caused by adiabatically compressing the vapor is less than a temperature increase in the first portion of the steam caused by adiabatically compressing the first portion of the steam. Adiabatically compressing the vapor may cause a temperature of the vapor to increase to less than about 150° C., and adiabatically compressing the first portion of the steam may cause a temperature of the first portion of the steam to increase to less than about 164° C.

In one embodiment of the process, the process further comprises, before conveying the vapor through the hot side of the heat exchanger, the step of adiabatically compressing the vapor to a pressure less than about 125 kPa absolute.

In one embodiment of the process, the solids are dried in a dryer having a vapor space at a pressure within about 1 kPa of the ambient pressure, which may be either less than or greater than the ambient pressure. In one embodiment, the pressure of the vapor space is at a pressure of less than 1 kPa below the ambient pressure. The dried solids may have a temperature of about 100° C. or above. In one embodiment of the process, the pressure of the vapor space is less than about 90 kPa absolute. The dried solids may have a temperature of about 46° C. to about 97° C.

In one embodiment of the process, the process further comprises the steps of conveying the dried solids and a second portion of the steam through a sealed conduit to strip residual solvent from the dried solids. The dried solids and the second portion of the steam may be conveyed in counter-current to each other through the sealed conduit. The process may further comprise the steps of:

(a) conveying the vapor through a baghouse to remove fine solids from the vapor; and (b) combining the fine solids with the dried solids after being stripped of residual solvent.

In one embodiment of the process, the process further comprises the steps of:

(a) conveying the vapor through a baghouse to remove fine solids from the vapor; and (b) conveying a portion of the superheated steam through the baghouse to maintain the vapor in the baghouse at a temperature above a dew point temperature, thereby preventing condensation of the vapor in the baghouse.

In one embodiment of the process, a portion of the water stream remains in a liquid state after being conveyed through the cold side of the heat exchanger, and the method further comprises the step of using the portion of the water that remains in the liquid state in producing the water stream of step (b), as the process continues.

In one embodiment of the process, the process further comprises the steps of:

(a) conveying the first portion of uncondensed vapor through a hot side of a second heat exchanger, thereby producing from the first portion of the uncondensed vapor, a second portion of uncondensed vapor, and a second cooled stream comprising a second portion of condensed water; and (b) separating the second portion of condensed water from the second cooled stream, and using the separated second portion of the condensed water in producing the water stream of step (b) of claim 1, as the process continues;

(c) conveying the second portion of uncondensed vapor through a hot side of a third heat exchanger, thereby producing from the second portion of the uncondensed vapor, a third cooled stream comprising a third portion of condensed water; and (d) separating the third portion of condensed water from the third cooled stream, and using the separated third portion of the condensed water in producing the water stream of step (b) of claim 1, as the process continues.

A temperature of the second portion of condensed water may be greater than a temperature of the third portion of condensed water. An amount of the separated second portion of the condensed water used in producing the water stream of step (b) of the process, as first described above, is greater than an amount of the separated third portion of the condensed water used in producing the water stream of step (b) of the process, as first described above.

In an embodiment of the process, the solvent comprises hydrocarbons with five to twelve carbon atoms per molecule.

In another aspect, the present invention comprises a system for recovering solvent from spent oil sand solids. The system comprises:

(a) a dryer comprising a dryer solids inlet, a dryer superheated steam inlet, and a dryer vapor outlet;
(b) a first flow path comprising the following elements in sequential fluid communication:
  (i) the dryer vapor outlet;
  (ii) a hot side of a first heat exchanger; and
  (iii) a first separator comprising a first separator water outlet; and
(c) a second flow path comprising the following elements in sequential fluid communication:
  the first separator water outlet;
  (ii) the cold side of the first heat exchanger;
  (iii) a vacuum blower for applying a vacuum to the cold side of the first heat exchanger, and adiabatically compressing steam exiting from the cold side of the first heat exchanger;
  (iv) a steam superheater; and
  (v) the dryer superheated steam inlet.

In one embodiment of the system, the system further comprises a blower for adiabatically compressing vapor exiting the dryer vapor outlet, wherein the blower is operable to adiabatically compress vapor exiting the dryer vapor outlet to cause an increase in the temperature of the vapor, wherein the vacuum blower is operable to adiabatically compress steam exiting from the cold side of the first heat exchanger to cause an increase in the temperature of the steam, wherein the increase in the temperature of the steam is greater than the increase in the temperature of the vapor.

In one embodiment of the system, the dryer comprises a dryer solids outlet with an air-lock device for maintaining a vapor space in the dryer under vacuum.

In one embodiment of the system, the system further comprises a sealed conduit for conveying dried solids from the dryer, and conveying steam from the cold side of the first heat exchanger in counter-current to the dried solids in the sealed conduit.

In one embodiment of the system, the system further comprises a baghouse for filtering fine solids from vapor exiting the dryer vapor outlet, a baghouse vapor outlet in communication with the hot side of the first heat exchanger, and a baghouse fine solids outlet in communication with the sealed conduit.

In one embodiment of the system, the system further comprises a baghouse for filtering fine solids from vapor exiting the dryer vapor outlet, and a conduit for conveying superheated steam exiting the steam superheater to the baghouse.

In one embodiment of the system, the system further comprises a conduit for recycling water from an outlet of the cold side of the heat exchanger to an inlet of the cold side of the heat exchanger.

In one embodiment of the system, the first separator further comprises a first separator vapor outlet, and the system further comprises:

(a) a third flow path comprising the following elements in sequential fluid communication:
  (i) the first separator vapor outlet;
  (ii) a hot side of a second heat exchanger; and
  (iii) a second separator comprising a second separator water outlet, and a second separator vapor outlet; and
(b) a fourth flow path comprising the following elements in sequential fluid communication:
  (i) the second separator vapor outlet;
  (ii) a hot side of a third heat exchanger; and
  (iii) a third separator comprising a third separator water outlet, wherein the second separator water outlet and the third separator water outlet are in fluid communication with the second flow path upstream of the cold side of the first heat exchanger.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 3 shows a table summarizing mass flow rates of water ($H_2O$ rate) and solvent ($C_6$-$C_9$ rate), temperature (T), and pressure (P) in various streams of the prior art process shown in FIG. 1, and the process of the present invention shown in FIG. 2, as predicted by a chemical process simulation.

DETAILED DESCRIPTION OF EMBODIMENTS OF THE INVENTION

The present invention relates generally to a process of recovering solvent from spent oil sand solids using superheated steam. The invention is particularly useful for recovering solvent having five to twelve carbon atoms per molecule or mixtures thereof including, but not limited to, pentane, hexane, heptane, octane, and nonane. For solvent having ten to twelve carbon atoms per molecule, the process may not completely recovery the solvent, but can be used to partially recover the solvent.

Figure 1:
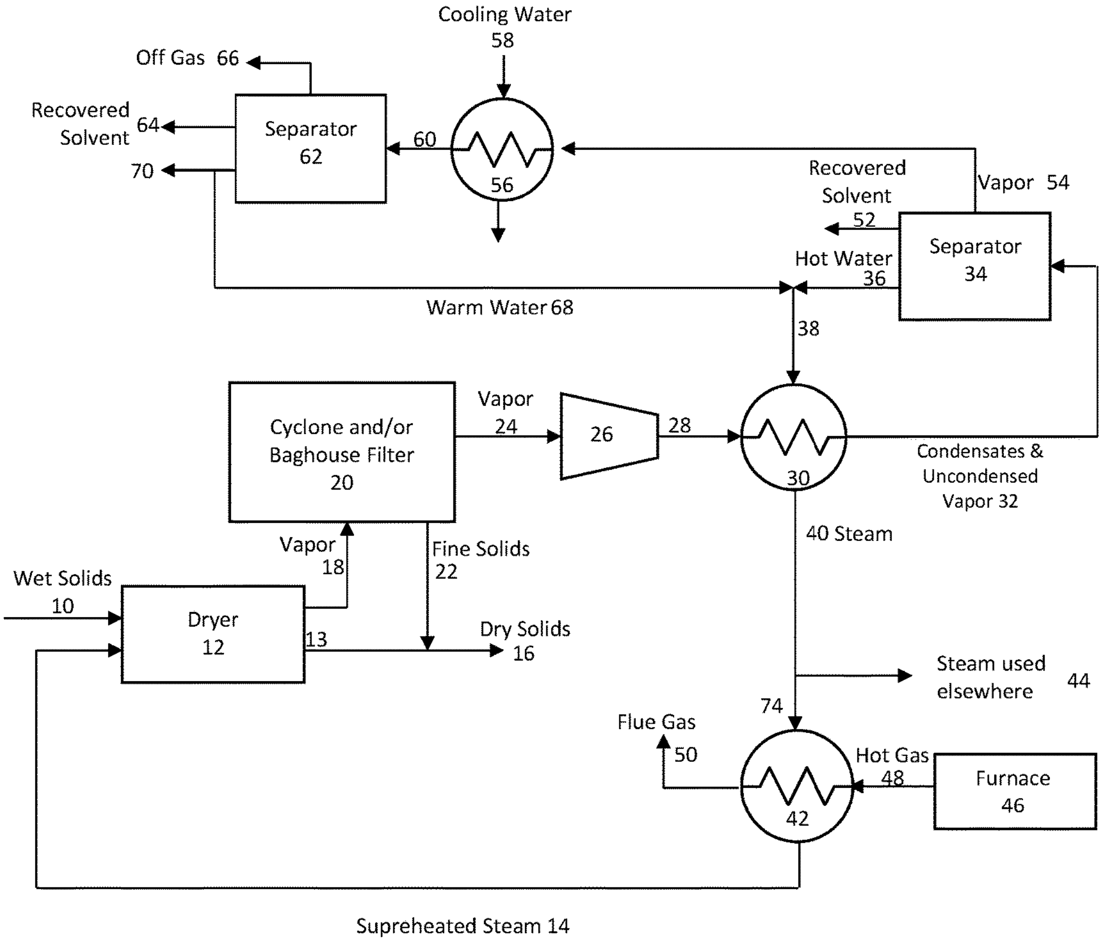
FIG. 1 PRIOR ART
FIG. 1 is a schematic flow diagram of one embodiment of a prior art process for recovering solvent from spent oil sands solids, as described in Canadian Patent No. 2,794,373 (Wu et al.).
Figure 2:
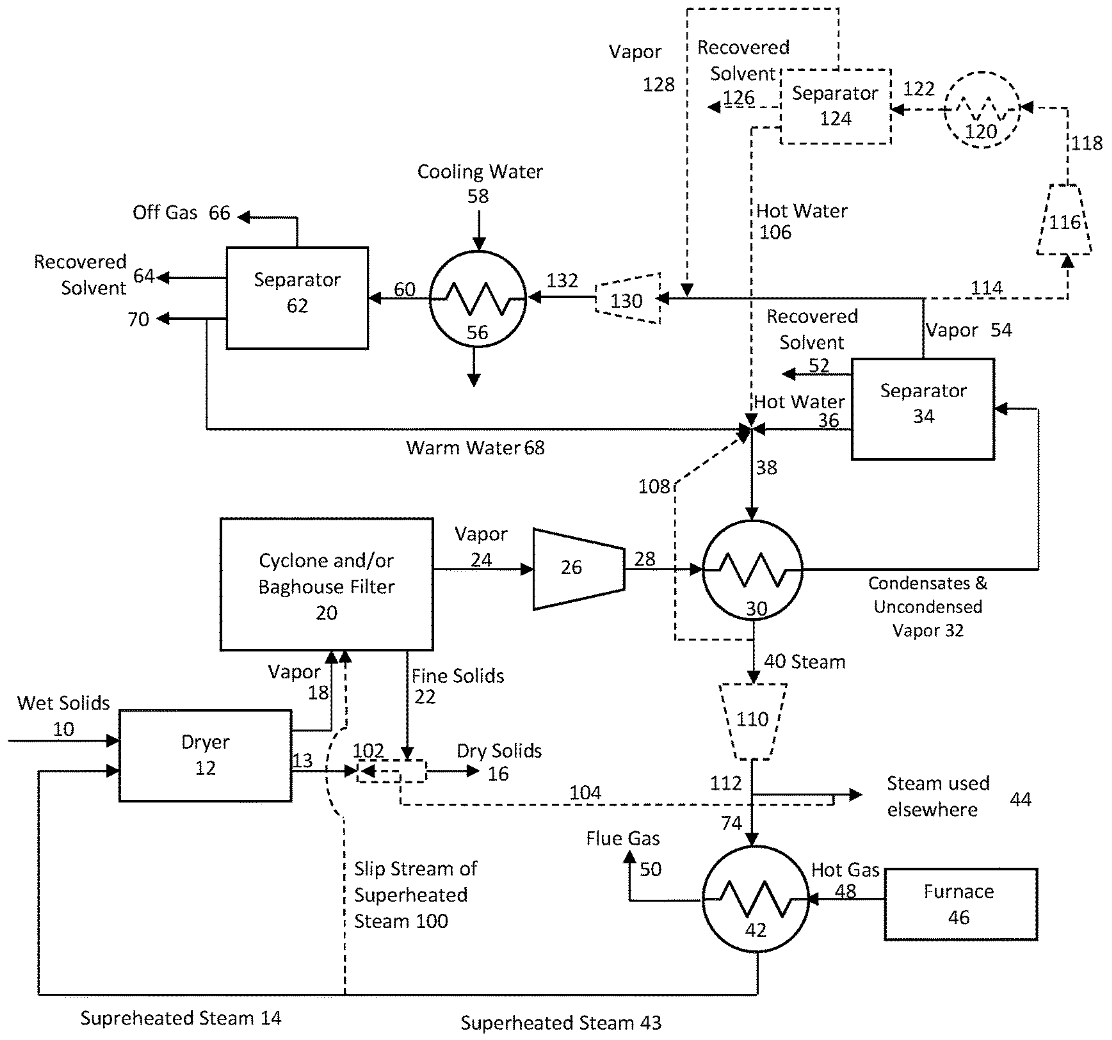
FIG. 2 is a schematic flow diagram of one embodiment of a process of the present invention for recovering solvent from spent oil sands solids.

FIG. 2 is a flow diagram of the process of the present invention. In FIG. 2, elements that are equivalent to the elements shown in FIG. 1 are assigned common reference numerals. Moreover, elements that are shown in dashed line in FIG. 2 indicate elements that are not shown in FIG. 1. The conduits among the various components may be constructed from any suitable piping as is employed in the art. Suitable piping includes, without limitation, plastic piping, galvanized metal piping, and stainless steel piping. In one embodiment, some of the conduits may comprise a screw conveyor or auger conveyor.

Referring to FIG. 2, wet spent oil sand solids 10 are fed into a dryer 12. In one embodiment, the dryer 12 is a direct dryer comprising a horizontal rotary drum having flights for lifting and cascading down solids. In one embodiment, the dryer 12 comprises a rotary drum with a diameter of about 6 m and a length of about 12 m.

The heat for the dryer 12 is provided by superheated steam 14. As used herein, the term "superheated steam" means steam at a temperature higher than water's boiling point at the same pressure. In one embodiment, the temperature of the superheated steam 14 ranges from 400° C. to 900° C. In one embodiment, the pressure of the superheated steam 14 fed to the dryer 12 and the pressure in the vapor space of the dryer 12 are both near ambient pressure (i.e, within about 1 kPa of the ambient pressure, which may be either greater than or less than the ambient pressure). In one embodiment, the pressure in the vapor space of the dryer 12 is less than 1 kPa below ambient pressure to prevent leakage of solvent vapor from the dryer 12. In another embodiment, the pressure of the superheated steam 14 and the pressure in the vapor space of the dryer 12 are both significantly below ambient pressure, in the range of 10 to 90 kPa absolute. As used herein "absolute" pressure means pressure measured in reference to a perfect vacuum. This makes water and solvents vaporize at about 3 to 54° C. lower than the temperature required in the case of the vapor space in the dryer 12 being near ambient pressure. In such embodiments, the wet solids stream 10 must be fed through an airlock-like device to maintain vacuum in the dryer 12.

The superheated steam 14 flow rate is set to a value which does not cause excessive dust carryover and premature solids removal prior to sufficient drying. Variation in feed moisture content is handled by adjusting the temperature of the superheated steam 14 to maintain the temperature of the resulting dry solids 13 at or above 100° C. when the vapor pressure in the dryer 12 is near ambient pressure, and at about 46 to 97° C. when the pressure in the dryer 12 is significantly below ambient pressure. Since the heat in dry solids 13 is mostly wasted, reducing the temperature of the dry solids 13 is beneficial from an energy efficiency standpoint. In one embodiment, the temperature of the vapor 18 produced by the dryer 12 is about 20° C. higher than the temperature of the dry solids 13 regardless of the dryer pressure. In the case where pressure in the vapor space of the dryer 12 is near ambient dryer pressure, the temperature of the exiting vapor 18 is always above 100° C. In one embodiment, the temperature of the vapor 18 is about 120° C.

The vapor 18 exits the dryer 12 through an insulated duct and is cleaned through a cyclone, baghouse, or both 20. The pressure in the cyclone/baghouse 20 is similar to that in the dryer 12. The cyclone of the cyclone/baghouse 20 creates a vortex to separate any fine solids 22 from the vapor 18. The baghouse of the cyclone/baghouse 20 is a collector in which fine solids 22 are removed from the vapor 18 by passing the vapor 18 through a fabric filter. The fine solids 22 are discharged and combined with the dry solids 13 to form combined dry solids 16 for transport to a disposal site. The combined dry solids 16 may be suitably treated to form trafficable solids before disposal (see for example, Canadian Patent no. 2,895,118 to Wu et al.). In one embodiment, the dry solids 13 go through a sealed screw conveyor 102 for the transportation. In one embodiment, a stream of slightly superheated steam 104, which may be a slip stream of steam 44, flows countercurrent to the dry solids 13 in the screw conveyor 102 to further strip residual solvents in the dry solids 13. The spent steam flows into dryer 12 and joins the dryer vapor 18. In one embodiment, fine solids 22 join the dry solids 13 after the countercurrent steam stripping to minimize dust carryover, and form the combined dry solids 16. The combined dry solids 16 must go through an airlock-like device to reach the atmosphere from an inert environment. In the case of dryer pressure significantly below ambient pressure, the airlock-like device also helps in maintaining a vacuum in the dryer 12.

The cyclone/baghouse 20 produces filtered vapor 24, which enters a blower or a compressor 26 which increases the pressure of the filtered vapor 24 by reducing their volume and producing compressed vapor 28. In the case where vapor pressure in the dryer 12 is near ambient pressure, the compression ratio is in the range of 1.0 to 1.5. In one embodiment, the compression ratio is about 1.3, and raises the pressure of the filtered vapor 24 from about 95 kPa to about 122 kPa absolute. In the case where vapor pressure in the dryer 12 is significantly below ambient pressure, the compression ratio is higher to raise the pressure of the filtered vapor 24 to the same level as the case where the vapor pressure in the dryer 12 is near ambient pressure. In one embodiment, the compressed vapor 28 is at about 122 kPa absolute regardless of the dryer pressure. Thus, the dew point of the compressed vapor 28 is about 105° C.

The compressed vapor 28 enters a heat exchanger 30. The heat exchanger 30 and all heat exchangers described herein may comprise any suitable single heat exchanger or multiple-stage heat exchangers and may be constructed from any suitable materials including copper and aluminum. In one embodiment, the heat exchanger 30 comprises multiple falling film evaporators. The compressed vapor 28 enters through the hot side of the heat exchanger 30 for cooling and condensation. As used herein, the term "condensation" means the change of the physical state of matter from the gaseous phase into the liquid phase, and is the reverse of vaporization. Condensation occurs when a vapor is cooled and/or compressed to its saturation limit when the molecular density in the gas phase reaches its maximum threshold.

The heat exchanger 30 produces a cooled stream 32 comprising condensates (water and liquid solvent) and uncondensed vapor. The cooled stream 32 is transferred from the heat exchanger 30 to a separator 34. In one embodiment, the separator 34 comprises a 3-phase separator. As used herein, the term "3-phase separator" means a vessel capable of separating water, liquid hydrocarbon, and gases in a process stream. The 3-phase separator may be horizontal or vertical.

Hot water 36 having a temperature ranging from 90° C. to 100° C. exits the separator 34, and combines with two hot water streams 106 and 108 to produce a stream of combined water 38. In one embodiment, the hot water 36 has a temperature of about 94° C. In one embodiment, the hot water 106 and 108 have temperatures of about 91° C. and about 88° C., respectively. In one embodiment, hot water 36 further combines with a warm water stream 68 to produce the combined water 38. In one embodiment, the warm water

68 has a temperature of about 60° C. In one embodiment, the combined water 38 has a temperature of about 92° C.

The combined water 38 enters through the cold side of the heat exchanger 30. Hot water that is not evaporated in the heat exchanger 30 is separated and recycled through water stream 108 to the combined water 38. In one embodiment, part of the stream 108 is purged and disposed to prevent accumulation of contaminants such as fine solids.

Pressure is reduced in the conduit carrying the combined water 38 by means of a vacuum blower 110 downstream of the heat exchanger 30. In one embodiment, the vacuum blower 110 can be any mechanical device that generates vacuum. In one embodiment, the pressure in the conduit that carries the combined water 38 is about 70 kPa absolute. The combined water 38 boils at about 90° C. to form saturated steam 40. As used herein, "saturated steam" means steam which is in equilibrium with heated water at the same pressure, i.e., it has not been heated past the boiling point for that pressure.

The liquid water-free saturated steam 40 enters the vacuum blower 110. In one embodiment, the steam 40 has a temperature of 88° C. and a pressure of 60 kPa absolute. After compression in the vacuum blower 110, the pressure of steam 112 increases to be slightly above the ambient pressure. In one embodiment, the steam 112 has a pressure of 110 kPa absolute and a temperature of 164° C. This makes the steam 112 slightly superheated.

A portion of the slightly superheated steam 112 is diverted to stream 44 for use in other processes such as, for example, solvent or water-based extraction. The majority of steam 112 follows conduit 74 and enters a heat exchanger, hereinafter referred to as a steam superheater 42. A furnace 46 generates a hot combustion gas stream 48 which enters the steam superheater 42 to superheat the steam 112. The cooled flue gas 50 exits the steam superheater 42. The superheated steam 43 generated in the steam superheater 42 is directed to the dryer 12. In one embodiment, the steam superheater 42 is a gas-gas heat exchanger. In another embodiment, the steam superheater 42 comprises heat exchanging surfaces built within the furnace 46. In one embodiment, a slip stream of superheated steam 100 is split from the main conduit of superheated steam 43 to the cyclone/baghouse 20 to increase the vapor temperature in there to about 130° C. This prevents condensation in the cyclone/baghouse 20. Downstream of the split, the superheated steam becomes stream 14.

The separator 34 also generates recovered solvent 52 and uncondensed vapor 54. In one embodiment, the pressure of vapor 54 is near ambient pressure. In one embodiment, a stream of uncondensed vapor is diverted via conduit 114 to a compressor or blower 116. The blower 116 slightly increases the pressure of the recovered vapor to overcome the friction losses in the downstream units. After the blower 116, the uncondensed vapor 118 enters a heat exchanger 120. In one embodiment, the heat exchanger 120 includes heating jackets and/or heating tubes in solvent or water-based extraction. After partial vapor condensation, the mixture 122 enters a separator 124. In one embodiment, the separator 124 comprises a 3-phase separator wherein the condensed hot water stream 106, recovered solvent 126 and uncondensed vapor 128 are separated. The hot water 106 is recycled in the combined water 38. The uncondensed vapor 128 is returned to the conduit that carries the uncondensed vapor 54.

The vapor 54 flows into a blower or compressor 130 to slightly increase the pressure to overcome the friction losses in the downstream units. After the blower 130, the vapor 132 enters a heat exchanger 56 for cooling and condensation mediated by cooling water 58 which flows through the heat exchanger 56. The cooled stream 60 flows into a separator 62. In one embodiment, the cooled stream 60 has a temperature of about 60° C. In one embodiment, the separator 62 comprises a 3-phase separator. The separator 62 separates warm water 68, recovered solvent 64, and off gas 66 from the cooled stream 60. In one embodiment, a portion of the warm water 68 is recycled to the combined water 38. The remainder of the warm water 70 is disposed or recycled in other processes such as, for example solvent or water-based extraction. The temperature for the cooled stream 60 may be lower if more volatile hydrocarbon solvents are present. The off gas 66 may be scrubbed in an oil scrubber to further remove solvent vapor before being released to the atmosphere or being combusted. Alternately, the off gas 66 may be combusted without oil scrubbing.

The multi-stage cooling and condensation process involving use of the heat exchanger 30, the separator 34, the heat exchanger 120, and the separator 124 conserves energy by recycling the combined hot water 38 near its boiling point at reduced pressure. The last cooling and condensation step involving use of the heat exchanger 56 and the separator 62 achieves high solvent recovery by cooling the vapor 132 to a lower temperature in the heat exchanger 56. In one embodiment, the solvent recovery in the process is above 98%. The lost solvent is mainly in the off gas 66, which is combusted or scrubbed and recovered. Only a trace amount of solvent is lost to the atmosphere in the combined dry solids 16.

Example.

Exemplary embodiments of the present invention are described in the following examples, which are set forth to aid in the understanding of the invention, and should not be construed to limit in any way the scope of the invention as defined in the claims which follow thereafter.

A modified version of the prior-art process shown in FIG. 1 and the process shown in FIG. 2 were simulated using Aspen HYSYS™ v8.4 2013 (AspenTech, Burlington, Mass.), a chemical process simulation software. The process of FIG. 1 was modified to include a blower 110 (analogous to that shown in FIG. 2) because the blower may practically be needed to compress the steam in conduit 74 upstream of the steam superheater 42 to overcome the pressure loss in steam superheater 42. A feed rate of wet solids 10 of 554 metric tonnes per hour (t/h) at 45° C. was assumed in the simulation. The wet solids 10 contained 5.7 weight % water (31.5 t/h) and 10.6 weight % solvent (58.8 t/h). The solvent was assumed to be a light naphtha cut (i.e., a mixture of hydrocarbon molecules having six to nine carbon atoms) with a boiling range of 73 to 168° C. It was further assumed that 28.7 t/h water and 58.8 t/h solvent were vaporized in a rotary dryer 12 that has a diameter of 6 m and a length of 12 m. The velocity of the vapor stream flowing through the cross-section of the dryer 12 was kept at 3 m/s. The air leak and/or nitrogen purge rate into the dryer 12 was assumed to be 0.36 t/h.

FIG. 3 shows a table that summarizes the simulation results for mass flow rates of water ($H_20$) and solvent ($C_7$), temperature (T), and pressure (P) in streams of the prior art process shown in FIG. 1 (denoted "FIG. 1"), and the process of the present invention in FIG. 2 (denoted "FIG. 2"), as predicted by the Aspen HYSYS™ simulation.

Figures 4, 5:
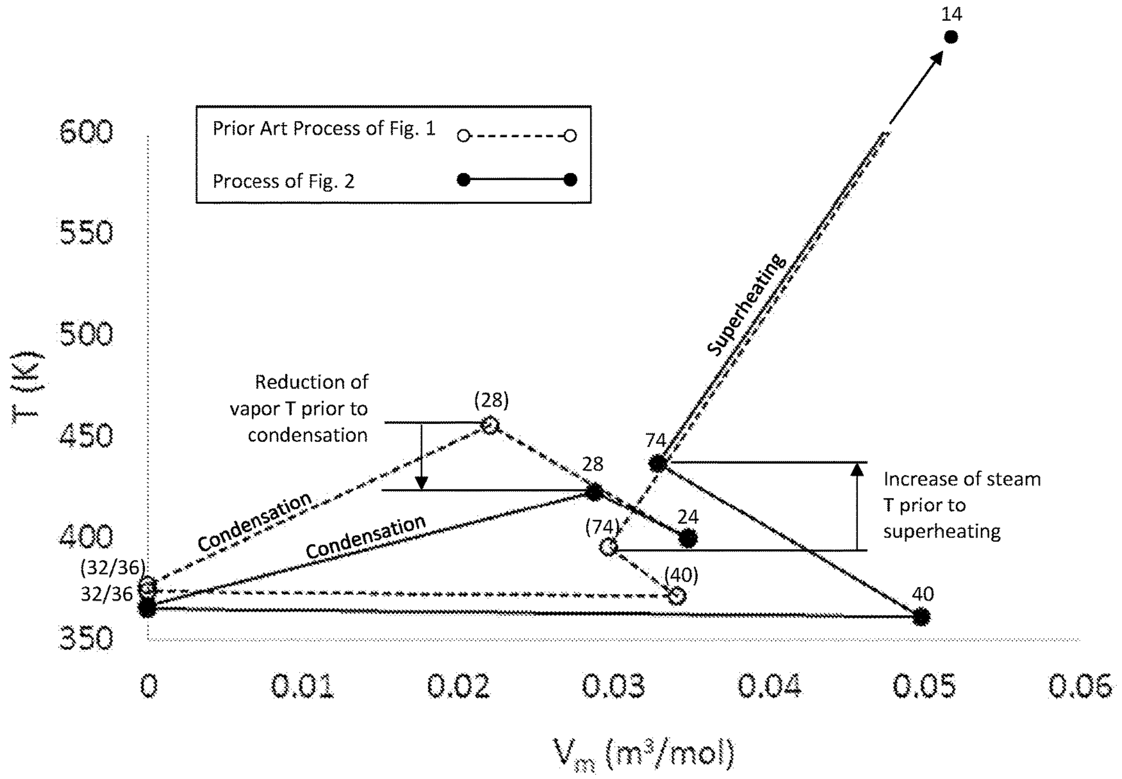
FIG. 4 shows a chart of temperature (T) versus molar volume ($V_m$) for water/steam as the heating medium as it proceeds through the prior art process shown in FIG. 1 (dashed line) and the process of the present invention shown in FIG. 2 (solid line), as predicted by a chemical process simulation.
FIG. 5 shows a table summarizing natural gas consumption and electricity consumption of an example of a modified version of the prior art process shown in FIG. 1, and an example of the process of the present invention shown in FIG. 2, as predicted by a chemical process simulation.

FIG. 4 shows a chart of temperature (T) versus molar volume ($V_m$) for water/steam as the heating medium as it proceeds through the prior art process shown in FIG. 1 (dashed line) and the process of the present invention shown in FIG. 2 (solid line), as predicted by the Aspen HYSYS™ simulation. Each dot represents the state of a stream. The stream numbers are shown beside the dots, with stream numbers for the process of FIG. 1 shown in parentheses.

FIG. 5 shows a table that summarizes the natural gas and electricity consumption of the prior art process shown in FIG. 1 (denoted "FIG. 1"), and the process of the present invention in FIG. 2 (denoted "FIG. 2"), as predicted by the Aspen HYSYS™ simulation.

Based on FIGS. 3 to 5, the following observations may be made. First, for the process of FIG. 2 in comparison to the process of FIG. 1, there is a significant reduction of temperature (33° C.) of stream 28 prior to vapor condensation by the heat exchanger 30. It is unexpected that, by evaporating the water under vacuum on the cold side of the heat exchanger 30, the vapor 24 on the hot side of the heat exchanger 30 needs little or no compression, while still maintaining a temperature difference of 15° C. between the two sides of the exchanger that is sufficient for proper heat exchange. With moderate or no compression of the vapor 24, the increase in the temperature of the vapor 24 due to the adiabatic compression is not as significant. For example, in the prior art process of FIG. 1, the compressor 26 compresses the vapor 24 to vapor 28 with a pressure increase of 76 kPa, and a temperature increase of 56° C. In contrast, in the process of FIG. 2, the compressor 26 compresses the vapor 24 to vapor 28 with a pressure increase of only 27 kPa, and a temperature increase of only 23° C. Thus, the lower temperature of vapor 28 helps in reducing the waste heat in form of surplus steam 44. Further, a lower temperature of vapor 28 is advantageous over a higher temperature of vapor 28 since the vapor 28 needs to be cooled to its dew point before it transfers significant heat. Therefore, the lower temperature of vapor 28 also reduces the heat exchanging duty of a cooling vapor prior to condensation. Because of low heat transfer coefficient for gas/vapor cooling, this reduction of heat exchanging duty improves the efficiency and reduces the required surface area of the heat exchanger 30 for the process of FIG. 2.

Second, for the process of FIG. 2 in comparison to the process of FIG. 1, there is a significant increase of temperature (41° C.) of the stream in conduit 74 prior to steam superheating by the steam superheater 42. This is also beneficial to the process efficiency since less energy input is required for the steam superheater 42 to produce the superheated steam 14, which is used to heat wet solids 10.

Third, for the process of FIG. 2 in comparison to the process of FIG. 1, electricity consumption is reduced by about 2.7%. It is surprising that to keep the same dew point difference of 15° C. between the hot and the cold sides of the heat exchanger 30 (in the process of FIG. 1, 115° C.-100° C.=15° C.; and in the process of FIG. 2, 105° C.-90° C.) when condensation and vaporization occur on both sides, the total electricity input in the process of FIG. 2 is less than the total electricity input in the process of FIG. 1.

Fourth, for the process of FIG. 2 in comparison to the process of FIG. 1, natural gas consumption is reduced by about 5.9%. In the process of FIG. 1, the main electricity input is to the blower 26 on the hot side of the heat exchanger 30. In contrast, in the process of FIG. 2, the main electricity input is to the vacuum blower 110 on the cold side of the heat exchanger 30. By using most of the electric energy on the cold side of the heat exchanger 30, the temperature of the newly generated steam 40 increases significantly on account of the adiabatic compression principle of thermodynamics. In the prior art process of FIG. 1, the steam from stream 40 to 74 increases in temperature by only 25° C. (from 98° C. to 123° C.). In contrast, in the process of FIG. 2, the steam from stream 40 to 74 increases in temperature by 76° C. (from 88° C. to 164° C.). Since this steam 40 is to be superheated by means of natural gas combustion in the furnace 46, preheating the steam 40 with the compression work of the vacuum blower 110 significantly reduces the amount of natural gas consumed by the furnace 46. It is surprising that this results in even more energy savings than the aforementioned reduction of electricity input.

In summary, adding the vacuum blower 110 to the prior art process of FIG. 1, decreases the total electricity and natural gas consumptions, reduces the amount of waste heat, and improves the heat transfer efficiency of the heat exchanger 30.

Fifth, for both processes, the solvent recovery from the cooled stream 32 of vapor condensed by the heat exchanger 30 is more than 99% (i.e., the $C_6$-$C_9$ Rate of 58.6 t/h of cooled stream 32, divided by the $C_6$-$C_9$ Rate of 58.8 t/h of the wet spent oil sand solids 10) if an oil scrubber (not shown) is added for the off-gas (stream 66).

References.

The following references are incorporated herein by reference (where permitted) as if reproduced in their entirety. All references are indicative of the level of skill of those skilled in the art to which this invention pertains.

Canadian Patent No. 2,794,373 (Wu et al.).
Canadian Patent No. 2,895,118 (Wu et al.)

Interpretation.

The detailed description set forth above in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A process for separating solvent from spent oil sand solids comprising the steps of:

(a) drying the solids using superheated steam, and thereby producing dried solids, and a vapor comprising the vaporized solvent and vaporized water;

(b) conveying the vapor through a hot side of a first heat exchanger, while conveying a water stream under vacuum through a cold side of the first heat exchanger, thereby heating the water stream to produce steam, and cooling the vapor to produce a first portion of uncondensed vapor, and a first cooled stream comprising a first portion of condensed solvent and a first portion of condensed water;

(c) separating the first portion of condensed water from the first cooled stream, and using at least part of the separated first portion of the condensed water in producing the water stream of step (b), as the process continues; and (d) using a first portion of the steam in producing the superheated steam of step (a), as the process continues.

2. The process of claim 1, wherein the cold side of the first heat exchanger is at a pressure of less than about 70 kPa absolute.

3. The process of claim 1, wherein producing the superheated steam comprises adiabatically compressing the first portion of the steam to heat the first portion of the steam.

4. The process of claim 3, wherein adiabatically compressing the first portion of the steam increases a pressure of the steam to less than about 110 kPa absolute.

5. The process of claim 3, wherein adiabatically compressing the first portion of the steam superheats the steam.

6. The process of claim 3, wherein the process further comprises the step of, before conveying the vapor through the hot side of the first heat exchanger, adiabatically compressing the vapor to heat the vapor, wherein a temperature increase in the vapor caused by adiabatically compressing the vapor is less than a temperature increase in the first portion of the steam caused by adiabatically compressing the first portion of the steam.

7. The process of claim 6, wherein adiabatically compressing the vapor causes a temperature of the vapor to increase to less than about 150° C., and adiabatically compressing the first portion of the steam causes a temperature of the first portion of the steam to increase to less than about 164° C.

8. The process of claim 3, wherein the process further comprises, before conveying the vapor through the hot side of the heat exchanger, the step of adiabatically compressing the vapor to a pressure less than about 125 kPa absolute.

9. The process of claim 1, wherein the solids are dried in a dryer having a vapor space at a pressure within about 1 kPa of the ambient pressure.

10. The process of claim 9, wherein the dried solids have a temperature of about 100° C. or greater.

11. The process of claim 1, wherein the pressure of the vapor space of the dryer is less than about 90 kPa absolute.

12. The process of claim 11, wherein the dried solids have a temperature of about 46° C. to about 97° C.

13. The process of claim 1, wherein the process further comprises the steps of conveying the dried solids and a second portion of the steam through a sealed conduit to strip residual solvent from the dried solids.

14. The process of claim 13, wherein the dried solids and the second portion of the steam are conveyed in countercurrent to each other through the sealed conduit.

15. The process of claim 13, wherein the process further comprises the steps of:

(e) conveying the vapor through a baghouse to remove fine solids from the vapor; and (f) combining the fine solids with the dried solids after being stripped of the residual solvent.

16. The process of claim 1, wherein the process further comprises the steps of:

(e) conveying the vapor through a baghouse to remove fine solids from the vapor; and (f) conveying a portion of the superheated steam through the baghouse to maintain the vapor in the baghouse at a temperature above a dew point temperature, thereby preventing condensation of the vapor in the baghouse.

17. The process of claim 1, wherein a portion of the water stream remains in a liquid state after being conveyed through the cold side of the heat exchanger, and the method further comprises the step of using the portion of the water that remains in the liquid state in producing the water stream of step (b), as the process continues.

18. The process of claim 1, wherein the process further comprises the steps of:

(e) conveying the first portion of uncondensed vapor through a hot side of a second heat exchanger, thereby producing from the first portion of the uncondensed vapor, a second portion of uncondensed vapor, and a second cooled stream comprising a second portion of condensed water;

(f) separating the second portion of condensed water from the second cooled stream, and using the separated second portion of the condensed water in producing the water stream of step (b) of claim 1, as the process continues;

(g) conveying the second portion of uncondensed vapor through a hot side of a third heat exchanger, thereby producing from the second portion of the uncondensed vapor, a third cooled stream comprising a third portion of condensed water; and (h) separating the third portion of condensed water from the third cooled stream, and using the separated third portion of the condensed water in producing the water stream of step (b) of claim 1, as the process continues.

19. The process of claim 18, wherein a temperature of the second portion of condensed water is greater than a temperature of the third portion of condensed water.

20. The process of claim 19, wherein an amount of the separated second portion of the condensed water used in producing the water stream of step (b) of claim 1 is greater than an amount of the separated third portion of the condensed water used in producing the water stream of step (b) of claim 1.

21. The process of claim 1, wherein the solvent comprises hydrocarbons with five to twelve carbon atoms per molecule.

* * * * *